(12) United States Patent
Schmitz

(10) Patent No.: US 8,556,271 B2
(45) Date of Patent: Oct. 15, 2013

(54) MULTILAYER METAL GASKET

(76) Inventor: Jeorg Schmitz, Overath (DE)

( * ) Notice: Subject to any disclaimer, the term of this patent is extended or adjusted under 35 U.S.C. 154(b) by 103 days.

(21) Appl. No.: 13/091,191

(22) Filed: Apr. 21, 2011

(65) Prior Publication Data

US 2011/0192369 A1   Aug. 11, 2011

Related U.S. Application Data

(62) Division of application No. 11/063,073, filed on Feb. 22, 2005, now abandoned.

(60) Provisional application No. 60/547,981, filed on Feb. 26, 2004.

(51) Int. Cl.
    *F02F 11/00*   (2006.01)
(52) U.S. Cl.
    USPC .......................................... 277/593; 277/595
(58) Field of Classification Search
    USPC ................................. 277/592, 593, 594, 595
    See application file for complete search history.

(56) References Cited

U.S. PATENT DOCUMENTS

| | | | |
|---|---|---|---|
| 5,427,388 A | | 6/1995 | Ueta |
| 5,431,418 A | | 7/1995 | Hagiwara |
| 5,628,518 A | | 5/1997 | Ushio et al. |
| 6,283,480 B1 | | 9/2001 | Miura |
| 6,431,554 B1 | * | 8/2002 | Miyamoto et al. ............ 277/593 |
| 6,827,352 B2 | * | 12/2004 | Ueta et al. ...................... 277/593 |
| 2002/0135135 A1 | * | 9/2002 | Fujino et al. .................. 277/590 |

FOREIGN PATENT DOCUMENTS

| | | |
|---|---|---|
| CN | 1035638 C | 8/1997 |
| CN | 1443276 A | 9/2003 |
| CN | 14432764 A | 9/2003 |
| JP | 04-105264 | 9/1992 |
| JP | 06050432 A | 2/1994 |
| JP | 06117542 A | 4/1994 |
| JP | 2000002335 | 1/2000 |
| JP | 2002286141 A | 10/2002 |

* cited by examiner

*Primary Examiner* — Michael Safavi
(74) *Attorney, Agent, or Firm* — Robert L. Stearns; Dickinson Wright, PLLC

(57) ABSTRACT

A multilayer metal gasket includes at least two metal gasket layers formed with an aligned opening and aligned opposing sealing beads surrounding the opening. A partial stopper layer is interposed between the gasket layers and is of lesser area than either of the gasket layers. The partial stopper layer extends from the opening outwardly beyond the sealing beads and is fixed to one of the layers on only one side of the sealing beads and is free on the opposite side.

8 Claims, 4 Drawing Sheets

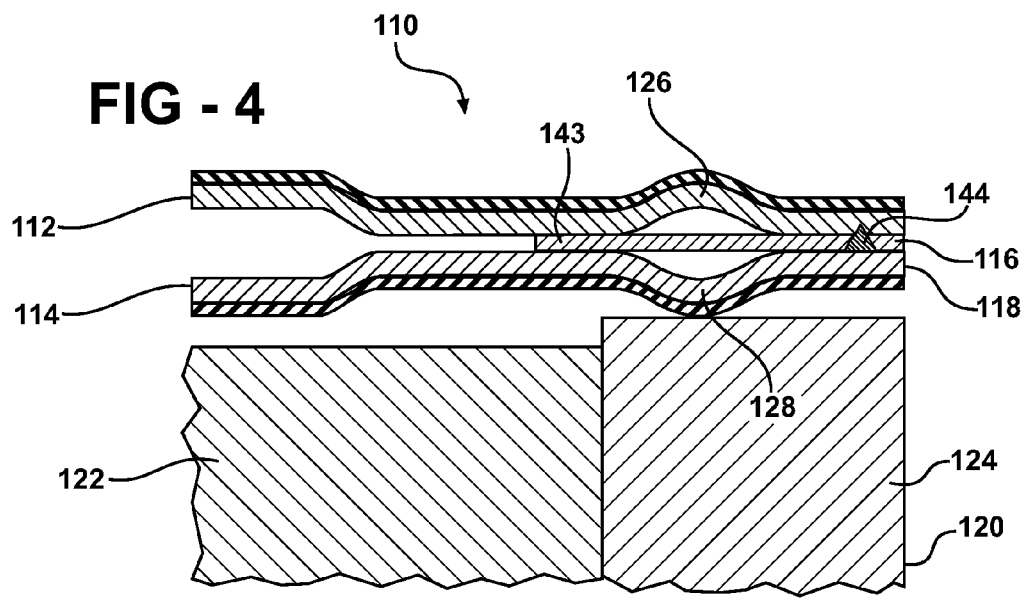
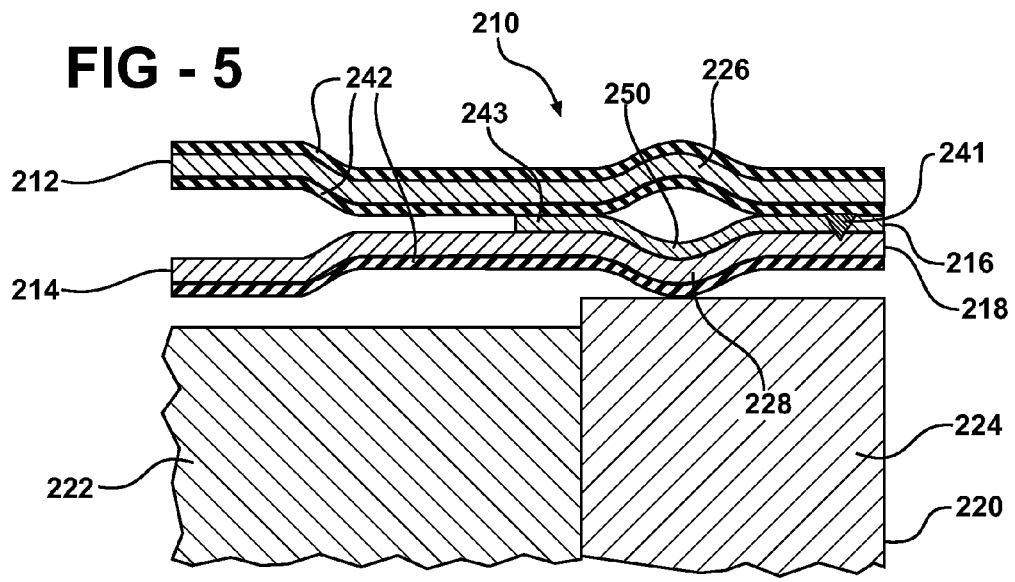

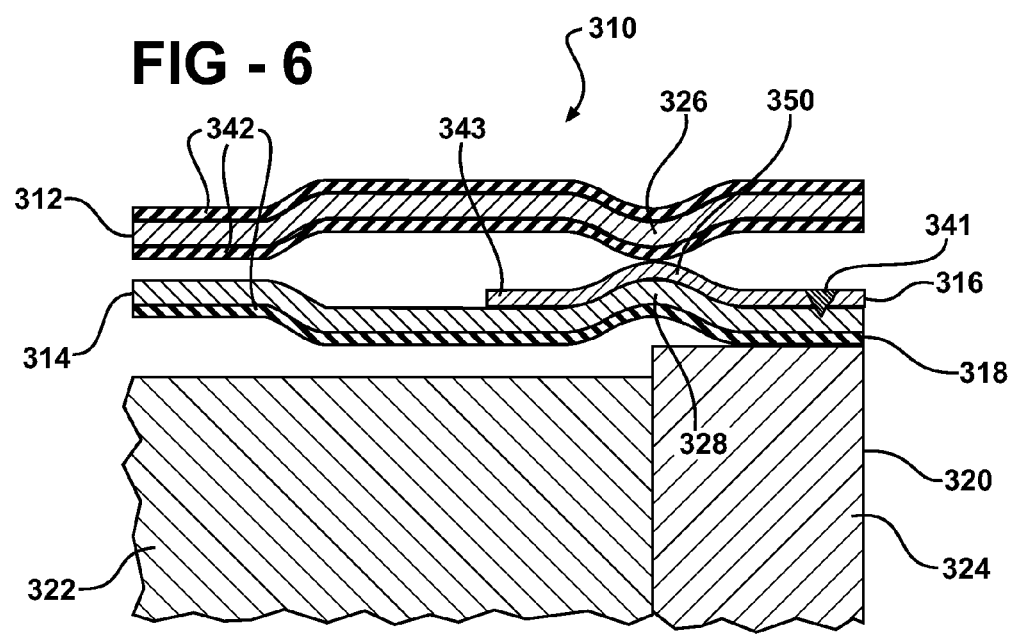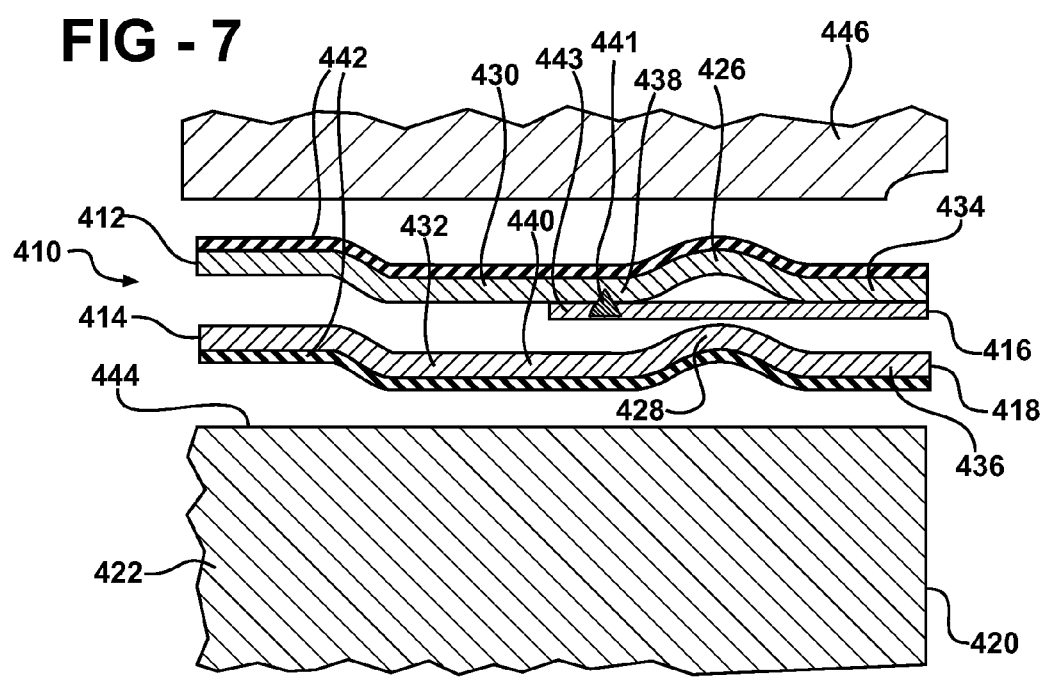

MULTILAYER METAL GASKET

CROSS-REFERENCE TO RELATED APPLICATIONS

This application is a divisional application of U.S. application Ser. No. 11/063,073, filed Feb. 22, 2005, now abandoned which claims the benefit of U.S. Provisional Application Ser. No. 60/547,981, filed Feb. 26, 2004, both of which are incorporated herein by reference in their entirety.

BACKGROUND OF THE INVENTION

1. Technical Field

This invention relates generally to multilayer metal gaskets, and particularly to those having at least two active bead layers separated by a partial stopper layer.

2. Related Art

Multilayer metal gaskets are commonly used in engine applications to provide a seal between two members that are joined by bolting or other clamping means, such as between a cylinder head and an engine block, or between an exhaust manifold and the block.

Various gasket configurations are known to the art and serve a variety of purposes. A particular application to which the present invention is directed is one in which the gasket is required to be of minimal thickness and able to seal effectively under fairly low contact pressure or able to conform to protrusions or recessions at the seal interface, such as in a cylinder head application where the cylinder liner protrudes above the top sealing deck of the engine block. Under these less than ideal sealing conditions, it is difficult to construct a seal that satisfies all of the criteria that such an application calls for.

For example, U.S. Pat. No. 5,544,899 discloses a multilayer metal gasket having a pair of functional layers formed with aligned openings and aligned beads surrounding the openings. A partial stopper layer is interposed between the functional layers in surrounding relation to the openings. In some of the embodiments, the stopper layer extends only partially across the sealing beads, enabling the beads to collapse against themselves under a clamping load. The concern here is that the full collapse of the beads could cause at least some degree of overcompression and permanent deformation of the beads and thus impair the sealing performance of the gasket. In at least one other embodiment, the stopper layer spans the full width of the beads and is welded on the opposite sides as well as deformed into nesting relation with one of the two opposing beads. It will be appreciated that the stopper layer in this embodiment would serve to constrain the deformation of the gasket layer that it is joined to by being welded on opposite sides of the bead. Consequently, the constrained functional layer compresses at a much higher load than that of the other layer, and the overall compression strength of the gasket increases, making it perhaps unsuitable for those applications calling for minimal gasket thickness and low compressibility.

U.S. Pat. No. 5,628,518 discloses another type of multilayer metal gasket which requires the middle layer to be a full layer rather than only a partial layer. While this may be suitable for many gasket applications, the full middle layer adds to the over all thickness of the gasket and thus may not be suitable for applications calling for minimal gasket thickness.

It is an object of the present invention to overcome or greatly minimize the shortcomings of the known prior gaskets and to provide a gasket that is best suited to minimal thickness, low compression applications.

SUMMARY OF THE INVENTION

A multilayer metal gasket constructed according to a presently preferred embodiment of the invention comprises at least a set of first and second gasket layers having generally planar bodies and formed with at least one aligned hole and at least one associated sealing bead in each of the gasket layers aligned opposite one another and projecting out of the plane of their respective bodies in radially outwardly spaced surrounding relation to the hole. The gasket further includes a partial stopper layer disposed between the gasket layers and having an area less than that of the either of the gasket layers. The stopper layer extends fully across the sealing bead from a position radially inward of the sealing beads to a position radially outward of the sealing beads and is fixed to at least one of the gasket layers adjacent only one side of the sealing beads and is free on the opposite side of the sealing beads.

One advantage of the present invention is that it provides a gasket of minimal thickness with relatively soft compressibility and controlled deformation of the sealing beads.

By extending fully across the sealing beads, the stopper layer has the beneficial effect of providing generally uniform compression of the complete sealing bead in all layers of the gasket. Further, by being joined to only one side and being free on the opposite side of the sealing beads, the stopper layer does not overly constrain deformation of the sealing bead on the gasket layer to which the stopper layer is joined, thereby giving more uniform deformation of the sealing beads.

BRIEF DESCRIPTION OF THE DRAWINGS

These and other features and advantages of the present invention will become more readily appreciated when considered in connection with the following detailed description and appended drawings, wherein:

FIG. 4 is a cross-sectional view of an alternative embodiment of the invention;

FIG. 5 is a cross-sectional view of still a further alternative embodiment of the invention;

FIG. 6 is a cross-sectional view of still a further embodiment of the invention; and FIG. 7 is a cross-sectional view of still a further embodiment of the invention.

DETAILED DESCRIPTION OF PRESENTLY PREFERRED EMBODIMENTS

Figure 1:
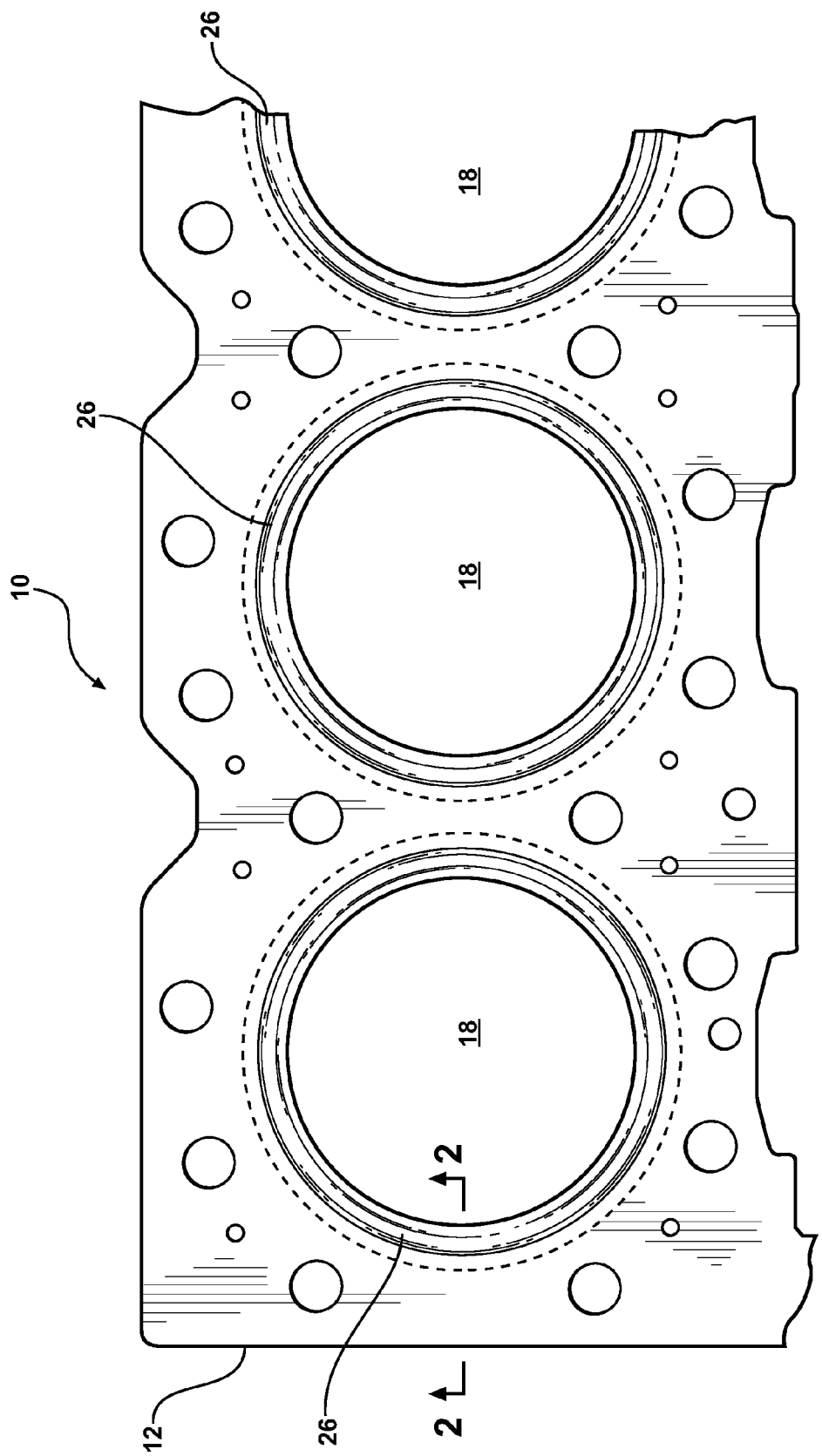
FIG. 1 is a fragmentary plan view of a gasket constructed according to a presently preferred embodiment of the invention.
Figure 2:
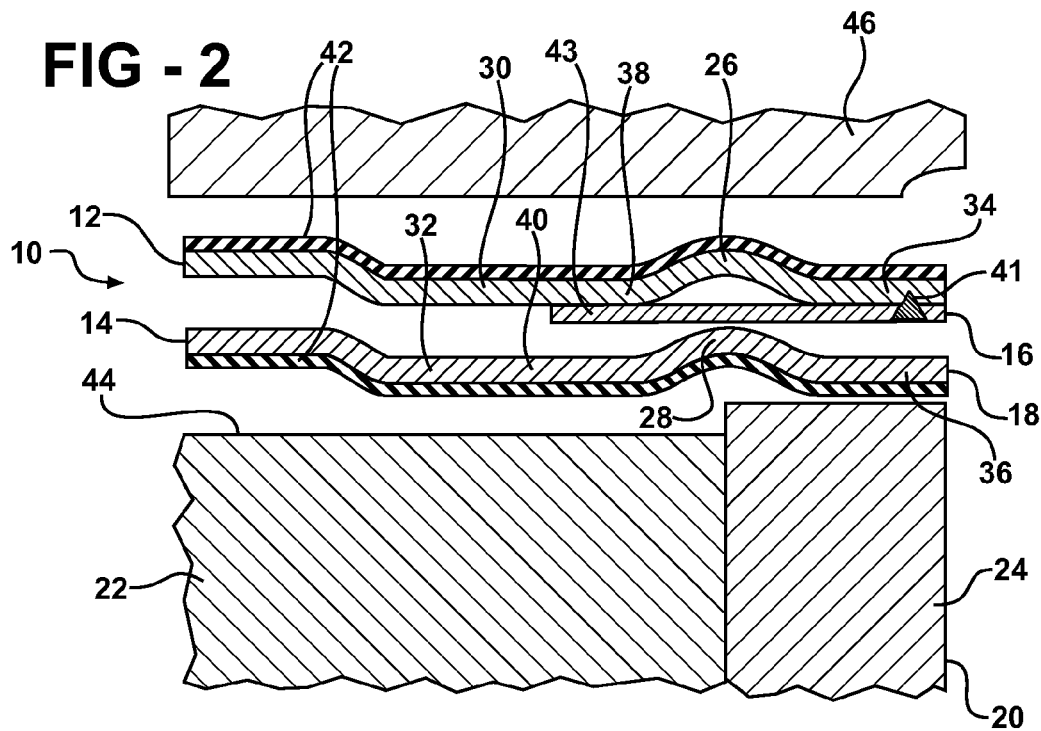
FIG. 2 is an enlarged cross-sectional view taken along lines 2-2 of FIG. 1.

A multilayer metal gasket constructed according to a first presently preferred embodiment of the invention is shown generally at 10 in FIGS. 1 and 2 and includes at least a set of first and second gasket layers 12, 14 and a partial stopper layer 16 between the gasket layers 12, 14. The gasket layers 12, 14 are each fabricated of elastic metal sheet material, such as stainless steel or the like, and are formed with various openings through the gasket layers, including at least one and often multiple cylinder openings 18 for engine cylinders 20 of an engine block 22 which, in some engines, may be fitted with a cylinder liner 24 shown in FIG. 2. The cylinder opening 18 and the gasket layers 12, 14 are aligned and each gasket layer 12, 14 is formed with a respective elastic sealing bead 26, 28 that encircle the opening 18. The sealing beads 26, 28 are formed as deformation of the first and second gasket layers 12, 14 and comprise a ridge of gasket layer material, preferably in the shape of a full bead, which projects from a plane of a main body 30, 32 of the respective gasket layers 12, 14. The sealing beads 26, 28 of the first and second gasket layers 12, 14 are arranged in opposing, aligned relationship such that they oppose one another, as shown in the embodiment of FIG. 2. The sealing beads 26, 28 are spaced radially outwardly of the cylinder opening 18, defining radially inner land regions 34, 36 surrounding the opening 18 and separating the sealing beads 26, 28 from the opening 18. The land regions 34, 36 are part of the main body 30, 32 of the gasket layers 12, 14 and are preferably planar and parallel to one another. On the opposite side of the sealing beads 26, 28 radially outwardly of the beads another outer land region 38, 40 has provided that likewise forms part of the main body 30, 32 and is planar and preferably parallel and still further preferably lies in the same plane and the radially inner land regions 34, 36, respectively, a rubberized gasket coating 42 may be applied to the outer exposed surfaces of the gasket layers 12, 14.

The partial stopper layer 16 is arranged between the gasket layers 12, 14, and more specifically is interposed between the sealing beads 26, 28. The partial stopper layer is "partial" in the sense that it has an area considerably less than the area of either of the first or second gasket layers 12, 14. As shown in FIG. 2, the partial stopper layer 16 extends from or near the cylinder opening 18 radially outwardly to the land regions 38, 40 just beyond the sealing beads 26, 28. The partial stopper layer 16 is fixed, preferably by welding, to at least one and preferably only one of the first and second gasket layers 12, 14. In the first embodiment of FIG. 2, the stopper layer 16 is fixed to the first gasket layer 12 by a weld joint 41 at a location radially inward of the sealing beads 26, 28. An opposite outward end 43 of the stopper layer 16 is located radially outward of the sealing beads 26, 28 and in this embodiment is free and unattached to either of the adjacent layers 12, 14. In the first embodiment of FIG. 2 as well as the other embodiments of the invention, it will be noted that the stopper layer is fixed at only one of its ends, preferably the radially inner end adjacent the cylinder opening 18, while the other end of the stopper layer on the opposite side of the sealing bead is unattached and free to move relative to the layer to which it is attached when the gasket 10 is clamped under compression. Specifically referring to the first embodiment of FIG. 2, it will be seen that the stopper layer 16 is secured to the radially inner land region 34 of the first gasket layer 12 at a location between the cylinder opening 18 and the sealing bead 26. The preferred means for securing the stopper layer 16 is welding, and preferably laser welding, although other techniques may be employed, such as, but not limited to riveting, adhesives, an intermediate bonding layer, or the like. In this first embodiment, the partial stopper layer 16 is planar. Further with this first embodiment, the aligned sealing beads 26, 28 extend in the same direction, with the sealing bead 26 of the first layer projecting outwardly of its main body 30, and the sealing bead 28 of the second layer 14 projecting in the same direction toward the first gasket layer 12. The peak of the sealing bead 28 of the second layer 14 contacts the underside of the stopper layer 16 opposite the side attached to the first gasket layer 12 in the region spanning the sealing bead 26 of the first gasket layer 12.

Figure 3:
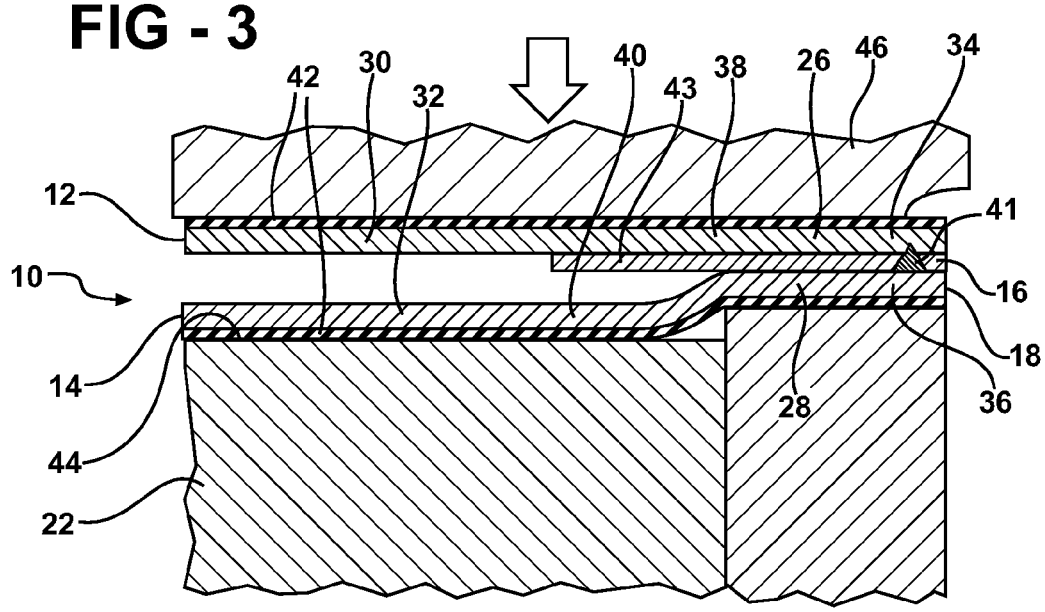
FIG. 3 is a view like FIG. 2 but showing the gasket in a compressed condition.

Referring additionally to FIG. 3, there is illustrated a condition in which the cylinder liner 24 projects slightly above a top deck 44 of the engine block 22. The gasket 10 is sufficiently soft in compressibility to accommodate the projecting liner and still form a suitable seal between the block 22 and liner 24 and a cylinder head 46 that is clamped by bolting or the like to the block 22 as illustrated in FIG. 3. The gasket 10 is able to deform under a relatively light clamping load to bridge the step formed between the projecting cylinder liner 24 and the top deck 44 of the block 22, and on the opposite side to form a seal with the cylinder head 46 so as to seal the engine cylinder 20 from leakage. With the stopper layer 16 being affixed to only one side of the sealing beads 26, the stopper layer does not overly inhibit the deformation of the sealing beads and lends to a softer, more readily compressible gasket of reduced thickness. In particular, as shown in FIG. 3, when the gasket is compressed, the sealing beads are pressed toward a flat condition and tend to spread out, causing slight movement of the gasket layers 12, 14, shown exaggerated in FIG. 3 for purposes of illustration. Any such movement or slippage of the gasket layers is not inhibited by the partial stopper layer since it is fixed on only one side of the sealing beads and is free at its opposite end 48.

A gasket 110 constructed according to a second embodiment of the invention is shown at FIG. 4, wherein the same reference numerals are used to indicate like features that are offset by 100, such as reference numerals 110, 112, 114, 118, 120, 122, 124, 126, 128, 143, and 144. This gasket 110 is of the same construction as that of the gasket of FIG. 2, except that the second layer 114 is reversed in its orientation, such that the sealing beads 126, 128 are each directed outwardly away from one another. A further distinction is that the stopper layer 116 is fixed to the second layer 114, although it could as well be fixed to the first layer 112 instead. The same benefits described above in connection with the gasket 10 of the first embodiment are evident in the gasket 110 of the second embodiment.

The gasket 210 constructed according to a third embodiment of the invention is shown in FIG. 5, in which the same reference numerals used in connection with the gasket 10 of the first embodiment, but are offset by 200, such as 210, 212, 214, 216, 218, 220, 222, 224, 226, 228, 241, 242, 243, and 250. The gasket 210 is identical in construction to that of FIG. 4, except that the stopper layer 216 is preformed with a bead 250 that nests with the bead 228 of the second layer to which it is attached.

FIG. 6 illustrates a gasket 310 constructed according to a fourth embodiment of the invention, wherein the same reference numerals are used to indicate like features, but are offset by 300, such as 310, 312, 314, 316, 318, 320, 322, 324, 326, 328, 341, 342, 343, and 350. In this embodiment, the orientation of the first gasket layer 312 is reversed such that the sealing beads 326, 328 project inwardly toward one another, and that the stopper layer 316, joined to the second gasket layer 314 is preformed with a bead 350 that nests with the sealing bead 328 of the second layer 314.

FIG. 7 illustrates a gasket 410 constructed according to a fifth embodiment of the invention, wherein the same reference numerals are used to designate like features, but are offset by 400, such as 410, 412, 414, 416, 418, 420, 422, 426, 428, 430, 432, 434, 436, 438, 440, 441, 442, 443, 444 and 446. In this embodiment, the gasket constriction is identical to that shown in FIG. 2, except that the attachment weld 441 is located on the radially outboard side 443 of the stopper layer outward of the beads 426, 428 instead of on the radially inward side. The portion of the stopper layer 416 radially inward of the beads 426, 428 is free and unattached to either layer 412, 414. It will also be observed in FIG. 7 that the engine block 422 lacks a liner. This gasket 410 is equally applicable to engines with liners and engines without liners, as are each of the other embodiments of the invention described above. It is to be understood that within the scope of the present invention it is contemplated that the same outward location of the attachment weld 441 as shown in FIG. 7 could be applied to each of the other embodiments of FIGS. 4-6.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A multilayer metal gasket, comprising:
   at least first and second gasket layers having generally planar bodies and formed with at least one aligned hole and at least one associated sealing bead in each of the gasket layers aligned opposite one another and projecting out of the plane of their respective bodies in the same direction and in radially outwardly spaced surrounding relation to said hole; and
   a partial stopper layer disposed between said gasket layers in contact with said gasket layers and having an area less than that of either of said gasket layers, said stopper layer extending fully across said sealing beads from a position radially inward of said sealing beads to a position radially outward of said sealing beads, and being fixed to at least one of said gasket layers radially outwardly of said sealing beads and being free radially inwardly of the sealing beads, wherein said stopper layer is fixed to only one of said gasket layers by a weld joint.

2. The gasket of claim 1 wherein said stopper layer is planar.

3. The gasket layer of claim 1 wherein said stopper layer is fixed at a radially outward end thereof.

4. The gasket of claim 1 wherein said stopper layer is fixed to said first gasket layer, said sealing bead in said first gasket layer extending away from said stopper layer to a peak and said sealing bead in said second gasket layer having a peak contacting said stopper layer.

5. An assembly, comprising:
   an engine block having at least one cylinder opening fitted with a cylinder liner;
   a cylinder head; and
   a gasket disposed between said engine block and said cylinder head having at least first and second gasket layers having generally planar bodies and formed with at least one aligned hole corresponding to said cylinder opening of said engine block and at least one associated sealing bead in each of the gasket layers aligned opposite one another and projecting out of the plane of their respective bodies in the same direction and in radially outwardly spaced surrounding relation to said hole; a partial stopper layer disposed between said gasket layers in contact with said gasket layers and having an area less than that of either of said gasket layers, said stopper layer extending fully across said sealing beads from a position radially inward of said sealing beads to a position radially outward of said sealing beads, and being fixed to at least one of said gasket layers radially outwardly of said sealing beads and is free radially inwardly of the sealing beads, and with said gasket engaging said cylinder liner, wherein said stopper layer is fixed to only one of said gasket layers by a weld joint.

6. The gasket of claim 5 wherein said stopper layer is planar.

7. The gasket layer of claim 5 wherein said stopper layer is fixed at a radially outward end thereof.

8. The gasket of claim 5 wherein said stopper layer is fixed to said first gasket layer, said sealing bead in said first gasket layer extending away from said stopper layer to a peak and said sealing bead in said second gasket layer having a peak contacting said stopper layer.

* * * * *